United States Patent [19]

Kritchevsky et al.

[11] 4,028,469

[45] June 7, 1977

[54] BREAD CONTAINING ALFALFA

[76] Inventors: David Kritchevsky, 136 Lee Circle, Bryn Mawr, Pa. 19010; Hilary Koprowski, 334 Fairhill Road, Wynnewood, Pa. 19096; Hanna Makolska, 3900 Chestnut St., Apartment 928, Philadelphia, Pa. 19104

[22] Filed: May 10, 1976

[21] Appl. No.: 684,571

[52] U.S. Cl. .................................. 426/551; 426/19
[51] Int. Cl.² .......................................... A21D 10/00
[58] Field of Search ................ 426/18, 551, 21, 19, 426/622, 615, 640

[56] References Cited

UNITED STATES PATENTS

| | | | |
|---|---|---|---|
| 1,104,136 | 7/1914 | Rich | 426/615 |
| 1,108,238 | 8/1914 | Rich | 426/615 X |
| 1,195,153 | 8/1916 | Rich | 426/615 |
| 1,428,628 | 9/1922 | Grelck | 426/622 X |
| 2,188,481 | 1/1940 | Otterbacher | 426/551 |

OTHER PUBLICATIONS

Horton, "Country Commune Cooking", 1974 pp. 135–136, Coward, McCann & Geoghegan, Inc. New York.

*Primary Examiner*—Raymond N. Jones
*Attorney, Agent, or Firm*—Schuyler, Birch, Swindler, McKie & Beckett

[57] ABSTRACT

A bread containing substantial quantities of alfalfa provides a convenient, palatable form of introducing significant quantities of alfalfa into the human diet. The bread, which preferably contains honey, retains breadlike texture, taste and odor despite the presence of substantial quantities of alfalfa. Alfalfa, a nonnutritive fiber, functions as a hypocholesteremic agent.

11 Claims, No Drawings

BREAD CONTAINING ALFALFA

BACKGROUND OF THE INVENTION

1. Field of the Invention

This invention relates to foodstuffs, more particularly, bread containing alfalfa.

2. Description of the Prior Art

Only in the last decade or so has civilized man become aware of the beneficial effects of nonutritive fibers which are present in substantial quantities in the diet of more primative cultures. The absence of these fibers in the diet of western man has been linked to such ailments as colon cancer and cardiovascular disease. See Spiller et al, "Role of Dietary Fiber in Nutrition",. Food Product Development, p. 31, September 1974.

In the past bread and other products made from doughs have been formulated to contain nonutritive fibers, usually in the form of bran or cellulose aggregates. The purpose of these nonnutritive additives, however, has been merely to serve as filler to reduce the caloric level of the foodstuff. See U.S. Pat. No. 3,574,634 to Singer. Bread containing vegetable nutrients such as finely divided spinach or vegetable flours has also been formulated as a means for introducing the nutrient into the human diet. See Savale, U.S. Pat. No. 2,264,721 and Tsen et al U.S. Pat. No. 3,752,675.

Recent studies by one of the present inventors have shown that alfalfa, a material not normally in the human diet, functions "in vitro" and "in vivo" in rats as an effective hypocholesteremic agent. See Kritchevsky et al, "Isocaloric, Isogravic Diets in Rats", Nutrition Reports International, Vol. 9, No. 5, May 1974. Alfalfa has the ability to bind from about 9 to 35 times as much bile salts as other nonnutritive fibers. See Kritchevsky, "Binding of Bile Salts in Vitro by Nonnutritive Fiber", Journal of Nutrition, Vol. 104, No. 4, April 1974.

A serious problem is presented, however in the application to humans of this formation gained by feeding alfalfa to laboratory animals. The quantity of alfalfa determined by applicants as necessary to have a beneficial effect in humans is too large to make tablets or other direct forms of ingestion feasible. Furthermore, the taste and odor of alfalfa are generally unpleasant and unacceptable to humans in most forms. It is, therefore, highly desirable to provide a foodstuff, common in the diet of western man which is capable of supplying significant amounts of alfalfa while maintaining a pleasant appearance and taste.

BRIEF SUMMARY OF THE INVENTION

It is an object of this invention to provide a bread-forming composition containing significant amounts of alfalfa.

It is a further object of this invention to provide an alfalfa-containing bread having a taste, texture and odor similar to conventional bread products.

These and other objects of the invention are achieved by providing a composition for preparing bread comprising a farinaceous dough containing at least about 5% by weight of alfalfa. The present invention also contemplates a bread product formed by baking this alfalfa-containing composition.

DETAILED DESCRIPTION OF THE INVENTION

The bread-forming composition of the present invention generally comprises a farinaceous dough containing flour, and other conventional bread dough adjuvants in admixture with a significant amount of alfalfa. Any form of alfalfa which can be conveniently incorporated into a bread dough may be employed. Preferably, the alfalfa is supplied in the form of standard alfalfa extract powder commonly called alfalfa flour.

The amount of alfalfa in the composition is very important. Applicants have determined that in order to achieve a significant hypocholesteremic effect, the human diet must include at least about 8 to 10 grams of alfalfa per day. Applicants have found that a bread-forming composition should contain at least about 5% by weight of alfalfa to provide a bread which supplies the requisite amount of alfalfa at reasonable bread consumption levels. However, the bread may comprise lesser amounts of alfalfa so long as sufficient bread is ingested to provide about 8 to 10 grams of alfalfa per day. A practical range of alfalfa content is about 3.5 to 10%, preferably about 5 to 10% of the bread-forming composition.

The flour may be any material presently used in bread formation. However, those flours with stronger flavors and darker colors such as half rye or whole wheat flour are preferred. The amount of flour in the composition is not critical and any amount which can be formed into a dough of usable consistency may be employed. Generally the amount of flour is from 45 to 65% by weight of the bread composition. In the preferred embodiments, flour represents about 50–60% by weight of the dough.

One conventional adjuvant employed in the bread-forming composition of the present invention is a liquid capable of rendering the flour into a dough-like mass. While any liquid which does not adversely affect the final characteristics of the bread may be employed, it is preferred to employ buttermilk as this liquid. The amount of this adjuvant is not critical and ranges from about 25 to 35% of the formulation depending on the ability of the mixture of liquid and flour to form a dough of usable consistency.

Another adjuvant in the bread-forming composition is a leavening agent. While yeast can be employed for this purpose, it is highly preferred to provide a yeast-free composition. In this instance, baking powder or a mixture of baking powder and baking soda is employed to provide the leavening. Baking powder-based formulations exhibit enhanced flavor and textural qualities despite the presence of substantial quantities of alfalfa.

Yet another adjuvant in the bread-forming composition is honey. It has been found that, quite unexpectedly, the presence of from about 3 to 12% honey based on the weight of the bread formulation markedly reduces the alfalfa odor and enhances the overall taste of the bread.

Finally, other seasoning adjuvants such as, for example, salt, may be included in the bread-forming composition of the present invention. The presence of salt in the alfalfa-containing bread-forming composition also enhances the flavor of the baked product.

The preferred embodiments of this bread-forming composition comprise:

FORMULA I

| | Parts by Weight |
|---|---|
| Flour | 61.3 |
| Buttermilk | 30.7 |
| Alfalfa | 5.1 |
| Salt | 1.3 |

| -continued | |
|---|---|
| Baking powder | 1.3 |
| Baking soda | 0.3 |

FORMULA II

| | Parts by Weight |
|---|---|
| Wheat flour | 52.8 |
| Buttermilk | 29.7 |
| Alfalfa | 6.6 |
| Honey | 7.4 |
| Salt | 1.3 |
| Baking powder | 1.2 |
| Baking soda | 0.3 |

The bread product of the present invention is made by baking a dough of the above-described composition in the conventional manner. In practice it has been found that baking times of about 40 minutes at about 524° F. provide a suitable product.

The following specific example is intended to illustrate more fully the nature of the present invention without acting as a limitation on its scope.

The following ingredients are mixed in a bowl:
3 cups whole wheat flour
30 grams alfalfa extract powder
1 teaspoon baking powder
¼ teaspoon baking soda
1 teaspoon salt Then 1½ cups of buttermilk are added to the above mixture and the resulting dough is kneaded on a floured surface. The dough is then shaped into a loaf and baked in an oven at 425° F. for 40 minutes. The resulting bread has good taste and texture.

While certain specific embodiments of the invention have been described with particularly herein, it should be recognized that various modifications thereof will occur to those skilled in the art. Therefore, the scope of the invention is to be limited solely by the scope of the claims appended hereto.

We claim:
1. A composition for preparing bread comprising a farinaceous dough containing a leavening agent and alfalfa, said alfalfa being present in an amount of from about 3.5 to 10% by weight.
2. The composition of claim 1 wherein said alfalfa is present in an amount of about 5% by weight.
3. The composition of claim 1 wherein said alfalfa is present in an amount of at least about 5% by weight of the bread formulation.
4. The composition of claim 1 wherein said alfalfa is in the form of a powder.
5. The composition of claim 1 wherein said farinaceous dough comprises as a major ingredient a flour selected from the group consisting of whole wheat and rye flour.
6. The composition of claim 5 further comprising a non-yeast leavening agent.
7. The composition of claim 6 wherein said leavening agent comprises baking powder.
8. The composition of claim 1 wherein said farinaceous dough comprises on a weight basis:
61.3% flour
30.7% buttermilk
5.1% alfalfa
1.3% salt
1.3% baking powder, and
0.3% baking soda.
9. The composition of claim 1 further containing honey.
10. A bread product produced by baking the composition of claim 8.
11. A bread product produced by baking the composition of claim 9.

* * * * *

UNITED STATES PATENT OFFICE
CERTIFICATE OF CORRECTION

Patent No. 4,028,469        Dated June 7, 1977

Inventor(s) David Kritchevsky, Hilary Koprowski and Hanna Makolska

It is certified that error appears in the above-identified patent and that said Letters Patent are hereby corrected as shown below:

The following claim has been added:

-- 12. A bread product produced by baking the composition of claim 1. --

On the title page, "11 Claims" should read -- 12 Claims --.

Signed and Sealed this

*Thirteenth* Day of *September 1977*

[SEAL]

Attest:

RUTH C. MASON      LUTRELLE F. PARKER
*Attesting Officer*      *Acting Commissioner of Patents and Trademarks*